United States Patent [19]
Tani et al.

[11] Patent Number: 5,735,606
[45] Date of Patent: Apr. 7, 1998

[54] PLATINUM TEMPERATURE SENSOR

[75] Inventors: Hiroji Tani, Nagaokakyo; Teppei Kubota, Kyoto, both of Japan

[73] Assignee: Murata Manufacturing Co., Ltd., Japan

[21] Appl. No.: 601,531

[22] Filed: Feb. 14, 1996

[30] Foreign Application Priority Data

Feb. 15, 1995 [JP] Japan .................. 7-026707

[51] Int. Cl.$^6$ .................. G01K 7/18; H01C 7/00
[52] U.S. Cl. .................. 374/185; 338/25; 338/28; 338/277
[58] Field of Search .................. 374/185; 338/25, 338/28, 22 R, 237, 252, 277

[56] References Cited

U.S. PATENT DOCUMENTS

| | | | |
|---|---|---|---|
| 4,375,056 | 2/1983 | Baxter et al. | 338/25 |
| 4,464,646 | 8/1984 | Burger et al. | 338/25 |
| 5,088,837 | 2/1992 | Shiokawa et al. | 374/185 |
| 5,181,007 | 1/1993 | Friese et al. | 338/25 |
| 5,197,804 | 3/1993 | Tani et al. | 374/185 |
| 5,294,910 | 3/1994 | Tani et al. | 338/306 |

FOREIGN PATENT DOCUMENTS

| | | | |
|---|---|---|---|
| 2615473 | 10/1977 | Germany | 374/185 |
| 0086428 | 5/1983 | Japan | 374/185 |

*Primary Examiner*—Diego F. F. Gutierrez
*Attorney, Agent, or Firm*—Ostrolenk, Faber, Gerb & Soffen

[57] ABSTRACT

A platinum temperature sensor showing excellent sensitivity to heat. The sensor comprises an insulating substrate having a support portion at one end of the substrate. A heat-generating portion is formed by a platinum film circuit at the other end of the substrate. A coating made from a material having a low thermal conductivity is formed on the support portion of the insulating substrate to suppress dissipation of heat from the support portion. A first heat-insulating gap is created between an end portion of the platinum film circuit and the heat-generating portion. A second heat-insulating gap is created between the platinum film circuit and the coating.

7 Claims, 2 Drawing Sheets

PLATINUM TEMPERATURE SENSOR

BACKGROUND OF THE INVENTION

1. Field of the Invention

The present invention relates to a platinum temperature sensor and, more particularly, to a platinum temperature sensor for use both as a temperature sensor for measuring ambient temperature, and as an air flow sensor for measuring a velocity of an air flow, and having excellent sensitivity to heat.

2. Description of the Related Art

When a platinum temperature sensor is used as a normal temperature sensor, the platinum temperature sensor is operated at a relatively low temperature so that the heat-generating portion generates relatively little heat. That is, the heat-generating portion is kept at substantially the ambient temperature surrounding the sensor by limiting a current flowing through the heat-generating portion.

On the other hand, when a platinum temperature sensor is used as an air flow sensor, the heat-generating portion is kept at a temperature higher than the temperature of the flowing gas by about 200° C. When air flows past the heat generating portion, the heat-generating portion loses heat in response to the velocity of the air flow. As a result, the temperature of the heat-generating portion decreases and the resistance of the sensor also changes. Thus, the velocity is measured by the platinum temperature sensor.

A conventional platinum temperature sensor 1 is shown in cross-section in FIG. 3. The temperature sensor 1 has an insulating substrate 3. The insulating substrate 3 has a support portion 2 at one end. A platinum film circuit 4 forming a heat-generating portion is formed at the other end of the insulating substrate 3. This platinum film circuit 4 is fabricated by forming a platinum film on the insulating substrate 3 and then processing the film to have desired features by microelectronic processing techniques. Electrodes 5 made of gold, for example, are formed at an end of the platinum film circuit 4. Lead wires 6 which are Ni/Pt-clad wires, for example, are connected to the electrodes 5, respectively. The connected portions of the lead wires 6 are coated with glass, to form a glass fixture 7. The platinum film circuit 4 is coated with protective glass 8.

In the above-described conventional platinum temperature sensor 1, the insulating substrate 3 is made of alumina which has a relatively high thermal conductivity. This is because a high thermal conductivity of the insulating substrate improves the response speed to a change in the temperature to be detected. However, a high thermal conductivity also causes transmission of heat generated by the platinum film circuit 4 to external structures connected to the platinum temperature sensor, or to the external atmosphere, through the insulating substrate. Consequently, a major portion of the heat is dissipated away from the heat-generating portion formed by the platinum film circuit 4. Furthermore, the heat generated by the platinum film circuit 4 is reduced. Hence, this conventional temperature sensor has the problem that its sensitivity to heat is generally low.

Other temperature sensors of background interest are disclosed in U.S. Pat. Nos. 5,197,804; 4,375,056; and 4,464,646, the disclosures of which are incorporated by reference herein.

In order to improve the sensitivity of the sensor, particularly as an air flow sensor, it is preferable for the heat-generating portion to be supported on a substrate having a high thermal conductivity so that there is a uniform temperature distribution over the entire heat-generating portion.

It is also preferable for heat generated at the heat generating portion to be prevented from dissipating, so that the sensor does not lose the heat from the heat-generating portion due to factors other than the air flow.

SUMMARY OF THE INVENTION

It is accordingly an object of the invention to provide a platinum temperature sensor which exhibits excellent sensitivity to heat.

A platinum temperature sensor of the present invention includes an insulating substrate having a support portion at one end, a platinum film circuit formed at the other end of the substrate and constituting a heat-generating portion, and a coating formed on the support portion of the insulating substrate and made from a material having a low thermal conductivity. A first heat-insulating gap is created between an end portion of the platinum film circuit and the heat-generating portion. A second heat-insulating gap is created between the platinum film circuit and the coating.

In this platinum temperature sensor, dissipation of heat from the support portion of the insulating substrate is suppressed by the coating and the first and second heat-insulating gaps.

The support portion capped with the coating made from a low thermal-conductivity material provides thermal insulation and so the platinum temperature sensor can be attached to a composite circuit substrate or the like via this support portion without increasing the problem of heat dissipation.

As a consequence, the dissipation of heat from the heat-generating portion formed by the platinum film circuit is reduced so that the heat-generating portion can be kept at a high temperature. Therefore, in the present invention, the response of the platinum temperature sensor to the air flow to be measured can be enhanced.

Furthermore, since the generation of heat by the heat-generating portion is improved, the area of the heat-generating portion can be reduced. This can make a temperature distribution over the heat-generating portion more uniform. That is, a high-temperature region will constitute a greater part of the heat-generating portion. Since the sensitivity and response to heat are enhanced as temperature of the heat-generating portion becomes higher, reducing the area of the heat-generating portion also enhances the response to heat.

Other features and advantages of the present invention will become apparent from the following description of the invention which refers to the accompanying drawings.

DETAILED DESCRIPTION OF AN EMBODIMENT OF THE INVENTION

Figure 1A:
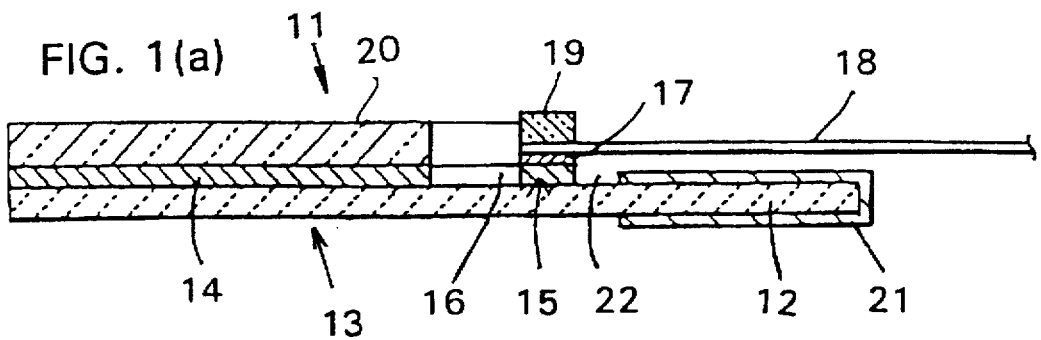
FIG. 1(a) is a cross-sectional view of a platinum temperature sensor according to an embodiment of the present invention.
Figure 1B:
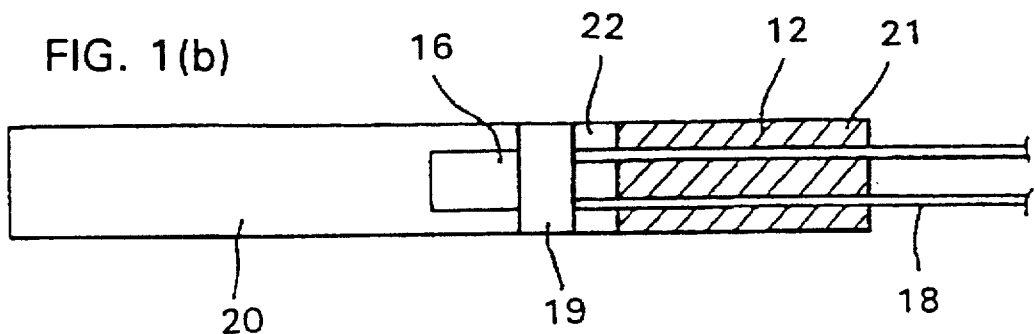
FIG. 1(b) is a plan view of the temperature sensor shown in FIG. 1(a)
Figure 1C:
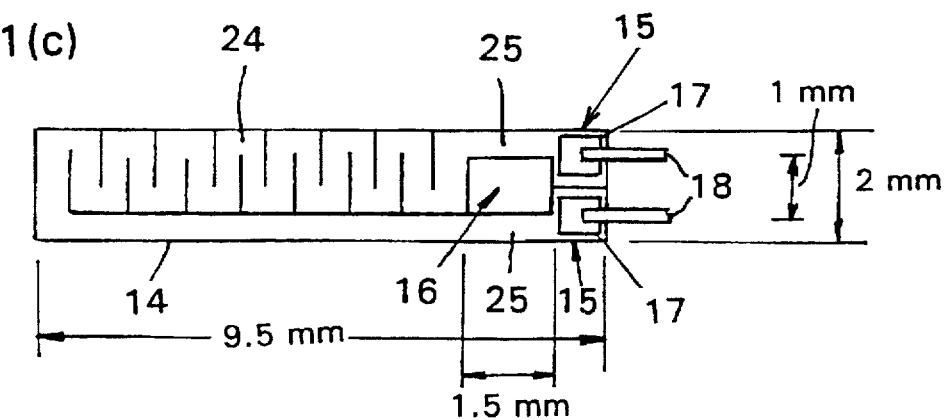
FIG. 1(c) is a plan view showing a platinum film circuit in the platinum temperature sensor in more detail.
Figure 3:
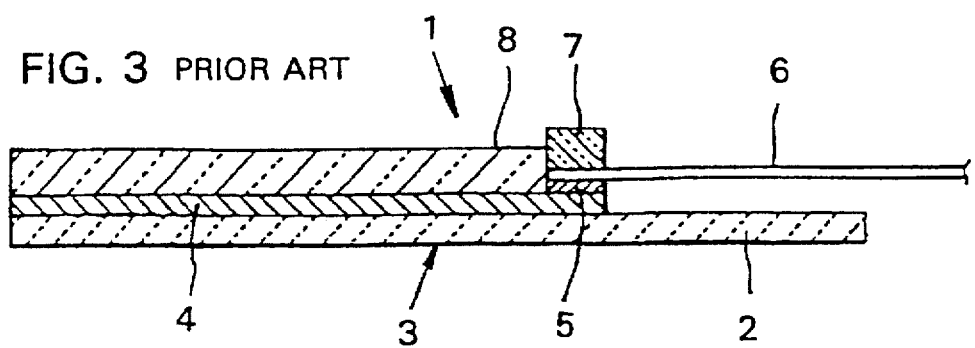
FIG. 3 is a cross-sectional view of the conventional platinum temperature sensor.

Referring to FIGS. 1(a) to 1(c), an embodiment of the present invention will be explained in detail. A platinum temperature sensor 11 includes an insulating substrate 13 and a platinum film circuit 14 supported by the insulating substrate 13.

Different materials can be used for the insulating substrate 13. In a case where the platinum temperature sensor 11 is required to have an excellent thermal response for measuring an ambient temperature, the insulating substrate 13 is preferably made of a material having a high thermal conductivity, such as alumina, aluminum nitride, or the like. Such a material can respond quickly to a change in temperature.

The insulating substrate 13 has a support portion 12 at one end of the substrate 13. The platinum film circuit 14 is located at the other end of the substrate 13. The platinum film circuit 14 has two end portions 15 and a meandering pattern which forms a heat-generating portion 24. A first heat-insulating gap (vacancy) 16 is provided between the end portions 15 and the heat-generating portion 24 so that electrical paths 25 on either side of the first heat-insulating gap 16 form connections between the end portions 15 and both ends of the meandering pattern of the heat-generating portion 24, respectively. The first heat-insulating gap 16 is interposed between the electrical paths 25. The electrical paths 25 preferably have substantially the same width w as that of the meandering pattern w. In the case where the platinum film circuit 14 has a size of 9.5 mm×2 mm, for example, the first heat-insulating gap 16 preferably has a size of 1.5 mm×1.0 mm, as shown in FIG. 1(c).

Electrodes 17 are formed on the end portions 15 and lead wires 18 which are Ni/Pt-clad wires, for example, are connected to the electrodes 17, respectively. A glass fixture 19 is formed so as to cover the connected portions of the lead wires 18. Protective glass 20 is formed so as to cover the platinum film circuit 14. Preferably, the protective glass 20 does not cover the heat-insulating gap 16.

A coating 21 covers the support portion 12 of the insulating substrate 13 and a second heat-insulating gap 22 is provided between the end portions 15 and the coating 21. The coating 21 is made from a material having a lower thermal conductivity than that of the insulating substrate 13 so that the coating 21 insulates the insulating substrate 13 thermally. Examples of the low-thermal conductivity material include inorganic ceramics, $ZrO_2$, and epoxy-polyamide mixture resin. The second heat-insulating gap 22 is a groove created by an edge of the end portion 15 and an edge of the coating 21. It is preferable that the width of the second heat-insulating gap 22 is as large as possible.

The aforementioned platinum film circuit 14 is fabricated in the manner described below. The platinum film is formed on the entire insulating substrate 13 by screen printing or sputtering techniques. Then, the platinum film is shaped by dry etching or laser processing so as to form the meandering pattern, the first heat-insulating gap 16, and end portions 15.

Figure 2A:
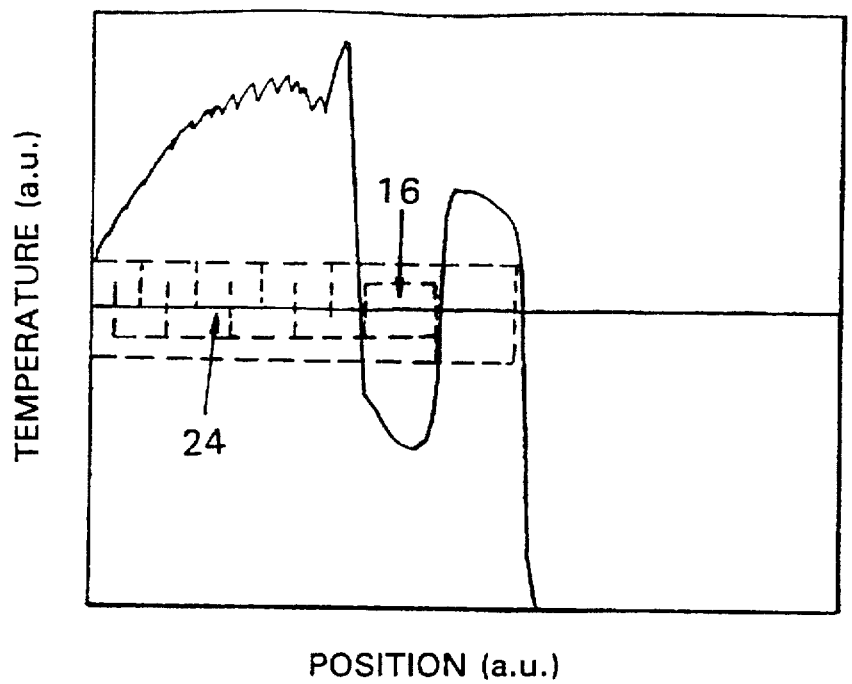
FIG. 2(a) is a graph showing a thermal distribution in the platinum temperature sensor.
Figure 2B:
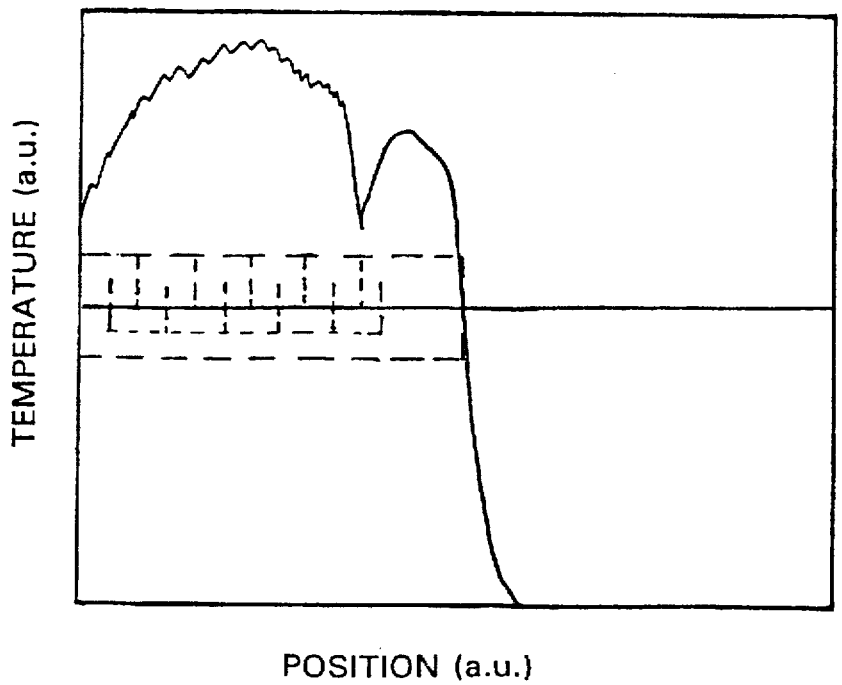
FIG. 2(b) is a graph showing a thermal distribution in a conventional platinum temperature sensor.

FIG. 2(a) shows, in part, a thermal distribution of the platinum temperature sensor of FIGS. 1(a)–1(c). The thermal distribution is measured along a longitudinal central axis. FIG. 2(b) shows a thermal distribution of a conventional platinum temperature sensor, measured under the same conditions for comparison. In these figures, the units along the axis are arbitrary. The horizontal axis denotes a relative position on the platinum temperature sensor along the longitudinal direction and the vertical axis denotes a surface temperature of the platinum temperature sensor. Dotted lines illustrate the plan view of the platinum temperature sensor. As can be seen from FIG. 2(a) the surface temperature abruptly drops at the position corresponding to the first heat-insulating gap 16. This means that dissipation of heat from the heat-generating portion 24 is suppressed effectively at the first heat-insulating gap 16. In contrast, in the conventional thermal distribution shown in FIG. 2(b), there is no such abrupt drop in the surface temperature.

A platinum film is essentially an excellent heat conductor, so portions other than the heat-generating portion can become an undesired dissipation path. Thus, thermal disconnection of such a path reduces the dissipation of heat. Specifically, the first heat-insulating gap 16 suppresses dissipation of heat from the heat-generation portion 24 to the electrodes 17, the glass fixture 19, and the lead wires 18. The second heat-insulating gap 22 suppresses dissipation of heat from the end portions 15 to the support portion 12 and the coating 21.

In addition, heat dissipation from the support portion 12 is suppressed by the coating 21. This further promotes retention of heat by the platinum film circuit 14. This suppression is especially beneficial in the case where the support portion of the platinum temperature sensor is attached to a base or a support having a relatively high heat conductivity.

Therefore, the response of the platinum temperature sensor 11 to heat can be further improved.

Although the platinum temperature sensor having the coating and the first and second heat-insulating gaps is explained as an embodiment of the present invention, it will be appreciated that any one of the coating, the first heat-insulating gap, or the second heat-insulating gap can be advantageously provided to the platinum temperature sensor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A platinum temperature sensor, comprising:
    an insulating substrate having a support portion at one end of said substrate;
    a platinum film circuit formed at another end of said substrate and having a heat-generating portion; and
    a coat formed on only said support portion of said insulating substrate and made from a material having a lower thermal conductivity than that of said insulating substrate, wherein a groove is defined on said insulating substrate by an end of said coat and an end of said platinum film circuit spaced therefrom, said groove preventing heat from dissipating from said platinum film circuit to said coat.

2. A platinum temperature sensor of claim 1, wherein said platinum film circuit has an end portion to be connected with a lead wire, and a vacancy is defined in said platinum film circuit between said end portion and said heat-generating portion so as to prevent heat from dissipating from said heat-generating portion to said end portion.

3. A platinum temperature sensor according to claim 1, wherein said insulating substrate comprises alumina.

4. A platinum temperature sensor according to claim 1, wherein said insulating substrate comprises aluminum nitride.

5. A platinum temperature sensor according to claim 1, wherein said coat comprises inorganic ceramics.

6. A platinum temperature sensor according to claim 1, wherein said coat comprises $ZrO_2$.

7. A platinum temperature sensor according to claim 1, wherein said coat comprises epoxy-polyamide mixture resin.

* * * * *